(12) United States Patent
Tarui et al.

(10) Patent No.: US 7,281,249 B2
(45) Date of Patent: Oct. 9, 2007

(54) COMPUTER FORMING LOGICAL PARTITIONS

(75) Inventors: Toshiaki Tarui, Sagamihara (JP); Shin Kameyama, Kodaira (JP); Frederico Buchholz Maciel, Kokubunji (JP); Toru Shonai, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 422 days.

(21) Appl. No.: 09/941,734

(22) Filed: Aug. 30, 2001

(65) Prior Publication Data

US 2002/0112102 A1    Aug. 15, 2002

(30) Foreign Application Priority Data

Jan. 24, 2001  (JP) ............................. 2001-015196

(51) Int. Cl.
*G06F 9/46*     (2006.01)
*G01R 31/08*    (2006.01)

(52) U.S. Cl. .................. 718/102; 718/107; 370/218

(58) Field of Classification Search .............. 712/10, 712/11, 13; 718/100–104, 107; 370/218
See application file for complete search history.

(56) References Cited

U.S. PATENT DOCUMENTS

| 5,414,851  | A    | 5/1995 | Brice, Jr. et al. |
|------------|------|--------|------------------|
| 6,226,734  | B1   | 5/2001 | Kleinsorge et al. |
| 6,279,098  | B1 * | 8/2001 | Bauman et al. ............... 712/13 |
| 6,763,519  | B1 * | 7/2004 | McColl et al. ............. 718/100 |

* cited by examiner

*Primary Examiner*—Meng-Al T. An
*Assistant Examiner*—Kenneth Tang
(74) *Attorney, Agent, or Firm*—Reed Smith LLP; Stanley P. Fisher, Esq.; Juan Carlos A. Marquez, Esq.

(57) ABSTRACT

A computer controls I/O allocation for partitions independently of CPU allocation and, in each I/O adapter and partition, the computer has a scheduling means controlling allocation for partitions of the I/O adapter by time sharing, a means to allocate the I/O adapter to partitions by space sharing and a means to dynamically change said allocation made by a partition-control program. Further, the computer has a means to monitor input/output performance of each partition, and a means to maintain SLA of a user program according to performance of each partition.

3 Claims, 19 Drawing Sheets

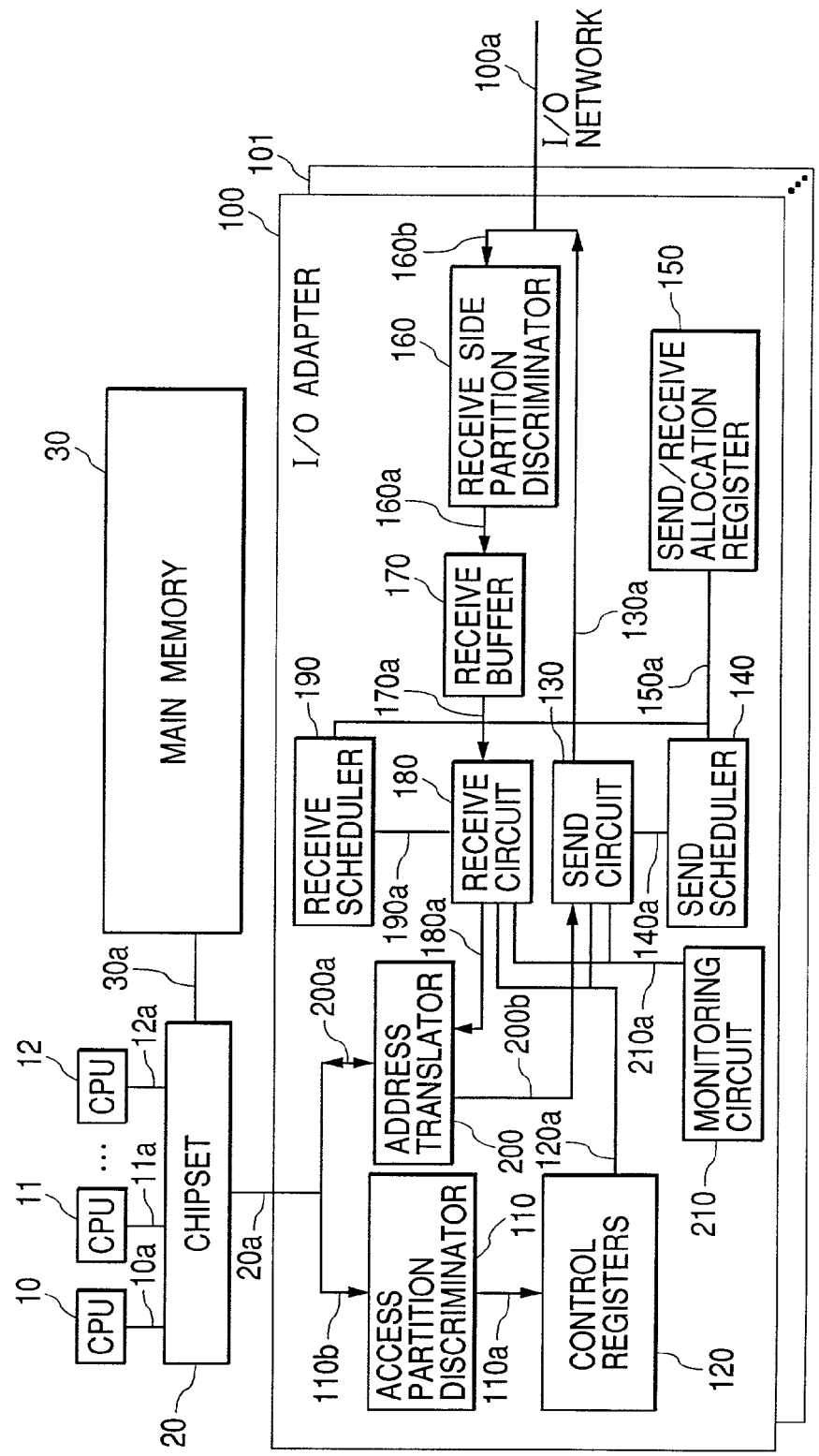

SEND/RECEIVE ALLOCATION REGISTER

FIG. 12

ADAPTER TLB 2000

| PARTITION NUMBER | PROCESS NUMBER | LOGICAL PAGE NUMBER | PHYSICAL PAGE NUMBER |
|---|---|---|---|
| 0 | 101 | 00010 | 00e25 |
| 1 | 245 | 00200 | 01002 |
| 0 | 101 | 00011 | 00e4f |
| ⋮ | ⋮ | ⋮ | ⋮ |

2001   2002   2003   2004

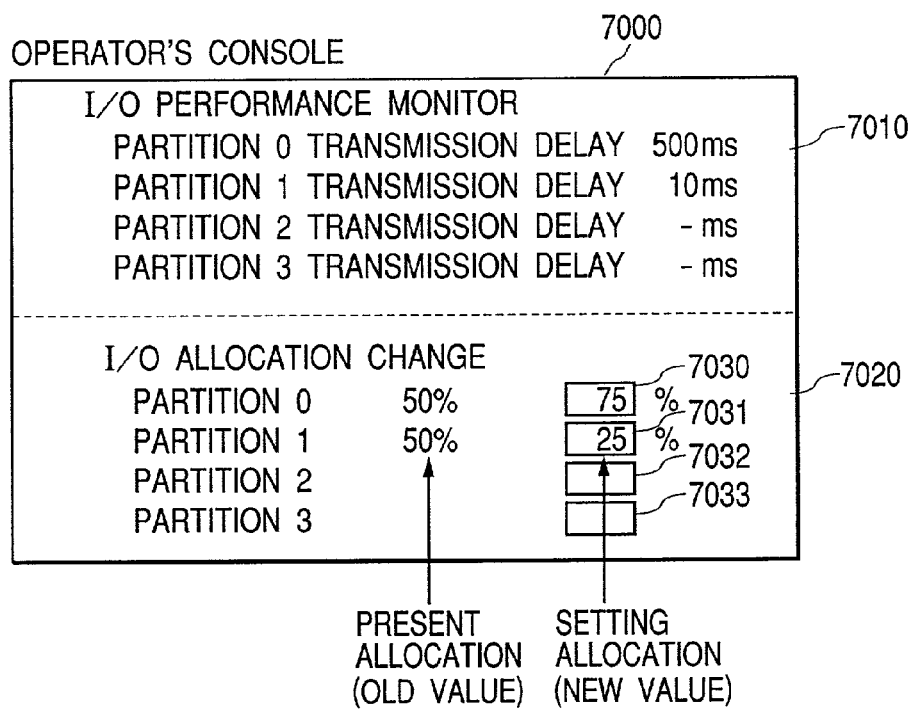

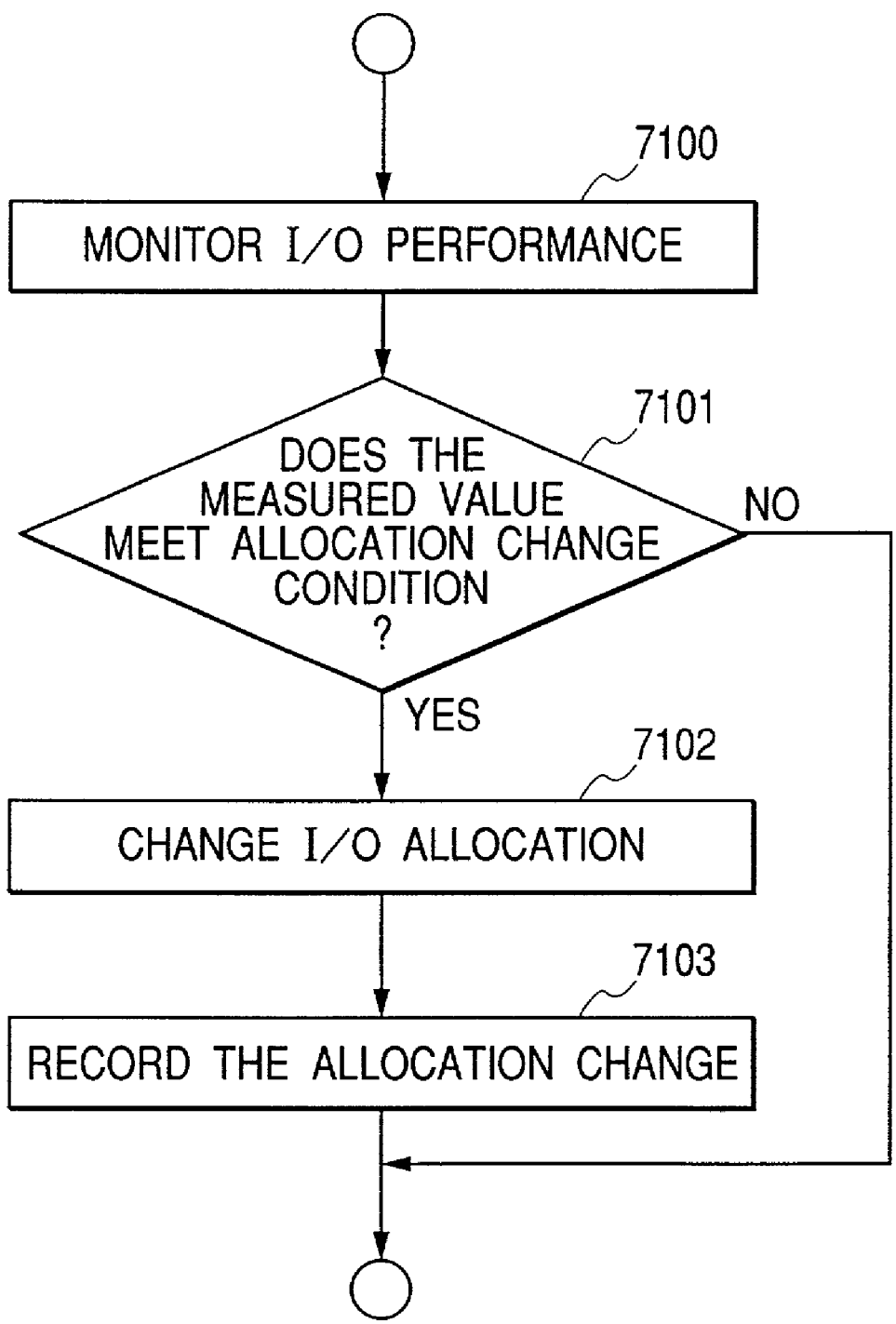

COMPUTER FORMING LOGICAL PARTITIONS

BACKGROUND OF THE INVENTION

The present invention relates to an information processor. More particularly, this invention relates to a computer system used for a server, a main frame, etc. and its input and output means which enable a plurality of partitions to operate in a single computer of the computer system.

Widely used for purposes such as reduction of TCO by consolidation of a plurality of computer systems or improvement in their utility using hot standby function is a technology which enables us to divide a computer system into a plurality of partitions, install an operating system in each partition, and run the partitions as if each partition were a physical computer system.

U.S. Pat. No. 5,414,851 discloses a logical partition (LPAR) technology for general-purpose computers. According to the technology, by using a partition-control program called hypervisor, CPUs are used on a time-sharing basis by partitions, of which the number is larger than that of the CPUs, to achieve consolidation in a computer system. Besides it is possible to control the allocation of time among the partitions with hypervisor. Moreover the sharing of I/O resources among partitions is achieved.

U.S. Pat. No. 6,226,734 discloses a technology which divides a parallel computer of a main-memory sharing type into a plurality of CPU groups and uses each group as a partition. According to the technology, the inside of a parallel computer can be divided into a plurality of partitions and the physical CPUs, the main memory, and the I/O device(s) of the computer can be allocated among the individual partitions.

New communication and I/O systems have been proposed recently in the field of I/O systems for computers. A new communication protocol of VIA Protocol has been proposed in "Virtual Interface Architecture Specification." By using the protocol and two technologies described below, considerable reduction in overheads on communication and higher-speed communication and input/output as compared with the communication systems currently in use can be accomplished.
(1) A technology enabling a user program to start communication directly without a system call to the OS (OS-bypassing start)
(2) A technology enabling a communication adapter to copy communication data directly from the user space without copying the communication data from a communication buffer of the user space to a communication buffer of the OS space (zero-copy start)

Furthermore a new-generation I/O architecture has been proposed, of which the core protocol is communication in accordance with the VIA. Under the circumstances, OS-bypassing and zero-copy starts such as the VIA would become the mainstream in future architectures for communication and input/output among computers.

There are, however, problems below if data are input into and output from a computer system divided into partitions by using the above technologies.

Although the use of CPU resources by partitions can be controlled flexibly, it is difficult to control the use of I/O resources.

It is possible to control, by using a partition-control program, what percentage of the CPU capacity each partition uses in a large computer. It is also possible to control how many CPUs are allocated to each partition in a parallel computer. Regarding the input and output of data into and from the partitions in a computer system, each partition is usually allocated a certain I/O adapter(s), allowing the sharing of I/O adapters among the partitions. It has, however, not been tried so far to control positively the allocation of I/O adapters among partitions in a computer system.

To input and output data with a conventional I/O system, system calls to start the I/O devices, copying of data areas, etc. require considerable CPU power; accordingly the I/O devices can be allocated a capacity in proportion to the CPU power by merely controlling the CPU power.

In the case of the new-generation I/O system which is being put to practical use, the I/O system is started without a system call to the OS or copying of communication data; therefore little CPU power is used to start the I/O system. Under the circumstances, becoming unworkable is the conventional method of controlling the use of I/O adapters indirectly by controlling the CPU power.

Among Internet-related programs of which the importance has recently been increasing rapidly, some require remarkably large I/O capacity as compared with conventional programs centering on CPUs. As for such programs, becoming unworkable is the conventional approach to balancing the CPU capacity and the I/O capacity of each partition in a computer system by just allocating each partition an I/O capacity in proportion to its CPU capacity.

Regarding the present servers of Internet data centers, it is essential for such servers to keep SLAs (service level agreements). Necessary for maintaining the SLA level of user programs running on partitions are a function of controlling the use of I/O adapters by the partitions in addition to a function of controlling the use of CPUs by the partitions.

SUMMARY OF THE INVENTION

In accordance with the above, it is an object of the present invention to provide a computer system and its I/O means wherein the I/O capacity to be used by each partition is controlled independently of the CPU allocation to said partition.

It is another object of the present invention to maintain the SLA level of the user program on each partition by controlling the I/O capacity allocated to said partition.

With the increasing speeds of networks and I/O devices in recent years, allowing a partition to occupy an I/O adapter is inefficient because the performance of the I/O adapter cannot be made full use of.

Accordingly, it is yet another object of the present invention to control the allocation of I/O capacity among partitions in the case when a plurality of partitions share an I/O adapter and also in the case when a plurality of I/O adapters is allocated to each partition.

To achieve the above objects, a computer divided into partitions according to the present invention is provided with:

a means for instructing the allocation of I/O capacity among the partitions in accordance with the operator's input;

a means for booking the allocation of I/O capacity among the partitions beforehand in accordance with the set values of a setting file;

a means for measuring the I/O performance of each partition and means of causing a partition-control program to change the allocation of I/O capacity among the partitions automatically if the I/O performance of any partition goes below a prescribed level; and a means for causing the partition-control program to change the allocation of I/O capacity among the partitions automatically if the performance of the user program of any partition goes below the level prescribed in the SLA and it is judged that the performance down has been caused by a shortage of I/O capacity of said partition.

Provided in another preferred embodiment are (i) a means for causing each I/O adapter to input or output a prescribed quantity of data into or from the corresponding first partition and thereafter interrupt its input or output processing for the first partition, (ii) a means for repeating the same for the other corresponding partitions from the second one through to the last one, (iii) a means for resuming its input or output, as the case may be, processing for the first partition from the point where it interrupted its input or output processing previously, (iv) a means for repeating the same for the other partitions from the second one through to the last one, and (v) a means for repeating the above steps until it completes its input or output, as the case may be, processing for all the corresponding partitions. Thus, the time-sharing of each I/O adapter among corresponding partitions can be controlled. The allocation of I/O capacity among such partitions can be controlled by changing the parameter of the time sharing (the quantity of data which each I/O adapter can input or output continuously).

In yet another preferred embodiment of the present invention, a computer with a plurality of I/O adapters is provided with a means for controlling dynamically which I/O adapters are allocated to which partitions and thereby controlling the allocation of I/O capacity among the partitions.

BRIEF DESCRIPTION OF THE DRAWINGS

FIG. 1 is a block diagram of an embodiment of a computer of the present invention;

FIG. 12 is an illustration of an example of the configuration of an adapter TLB in an address translator of the computer of FIG. 1;

FIG. 17 is an illustration of an I/O-capacity-allocation-changing picture on the display of the operator's console for the computer of FIG. 1;

FIG. 18 is an illustration of an example of set values of a setting file for booking allocation of I/O capacity among partitions in the computer of FIG. 1;

FIG. 19 is a flowchart of the process of changing allocation of I/O capacity among partitions automatically in the computer of FIG. 1.

DESCRIPTION OF THE PREFERRED EMBODIMENTS

Figure 2A:
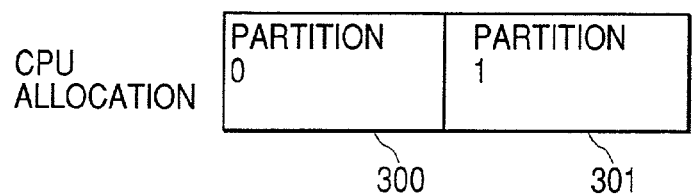
FIGS. 2A, 2B, and 2C are illustrations of examples of allocation of I/O capacity between partitions of the computer of FIG. 1.

FIG. 1 is a block diagram of a computer according to the present invention. The computer comprises CPUs 10, 11, and 12, a chip set 20, a main memory 30, and I/O adapters 100 and 101. The I/O adapters 100 and 101 are connected to an external I/O network 100a. The inside of only the I/O adapter 100 will be described in detail, for the other I/O adapter 101 has the same configuration as the I/O adapter 100.

An access partition discriminator 110 of the I/O adapter 100 determines which partition has accessed the I/O adapter 100. Which partition's or partitions' access the I/O adapter 100 handles is determined by setting the access partition discriminator 110. Control registers 120 accept the access by CPUs 10, 11, and 12. A send circuit 130 and a receive circuit 180 carry out actual input and output processing (sending and receiving data) in response to the access by CPUs 10, 11, and 12. An address translator 200 makes address translation to enable the send circuit 130 and the receive circuit 180 to access data on the main memory 30 by referring to logical addresses.

Because the user program gives input and output instructions to the I/O adapter 100 by using logical addresses, translation between logical and physical addresses has to be made in the I/O adapter 100. (i) The method by which the user program gives input and output instructions to the control registers 120 and (ii) the input and output processing of the send and receive circuits 130 and 180 in the I/O adapter 100 are the same as those in an I/O adapter currently in use, accordingly their detailed description is omitted.

When the I/O adapter 100 performs data I/O processing for a plurality of partitions, a send scheduler 140 and a receive scheduler 190 determine in what proportions the I/O adapter 100 should perform the data I/O processing for the partitions. A send/receive allocation register 150 regulates the allocation of I/O capacity among the partitions. A receive-side partition discriminator 160 determines which partition received data belongs to. A receive buffer 170 holds received messages. Besides a monitoring circuit 210 is provided to monitor the I/O performance of the partitions by using hardware.

Figure 2B:
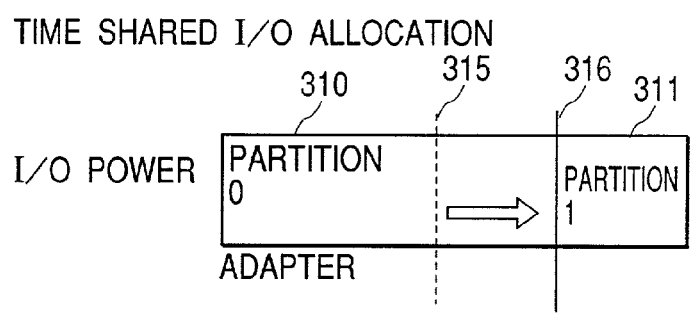
Figure 2C:
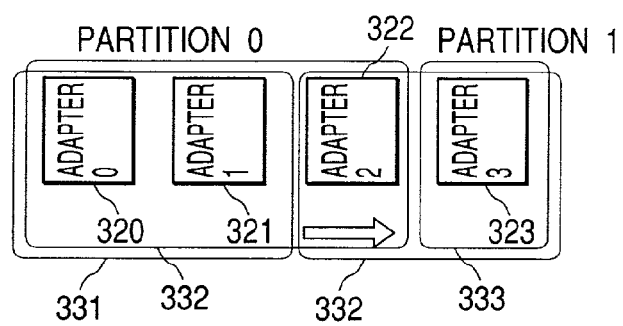

FIGS. 2A, 2B, and 2C show I/O-capacity allocation systems in accordance with the present invention. There are two partitions in the systems of FIGS. 2A, 2B, and 2C. As indicated by reference numerals 300 and 301 in FIG. 2A, the CPU capacity is allocated between the partitions 0 and 1 equally. In general, there are two I/O-capacity allocation systems; i.e. a time-sharing system as shown in FIG. 2B and a space-sharing system as shown in FIG. 2C.

In the time-sharing I/O-capacity allocation system, two partitions share an I/O adapter. The I/O capacity of the I/O adapter may, at first, be allocated between the two partitions 0 and 1 equally as indicated by the partition line 315. Then, as the occasion demands, the allocation of I/O capacity is changed to, for example, 75% for the partition 0 and 25% for the partition 1 as indicated by the partition line 316.

On the other hand, the space-sharing allocation is accomplished by allocating a plurality of I/O adapters 0 to 3 (320 to 323) to the partitions 0 and 1 on the premise that the I/O adapters 0 to 3 (320 to 323) are connected to one and the same external I/O switch so that they can communicate with one and the same device. Each partition may be allocated two I/O adapters at first as indicated by reference numerals 331 and 332 in FIG. 2C. Then, as the occasion demands, the allocation of the I/O adapters is changed to, for example, 75% for the partition 0 and 25% for the partition 1 as indicated by reference numerals 332 and 333 by switching the I/O adapter 2 (322) from the partition 1 to the partition 0.

In the computer according to the present invention, either the time-sharing allocation or the space-sharing allocation may be adopted or both may be adopted in combination. For example, the partitions 0 and 1 may use 2.5 and 1.5 adapters, respectively.

The feature of the present invention is to control the relation between partitions and I/O adapters and thereby control the respective I/O capacities of the partitions as shown in FIG. 2 by giving a control function of time-sharing allocation to the send/receive allocation register 150, the send scheduler 140, and the receive scheduler 190 and a control function of space-sharing allocation to the access partition discriminator 110 in the I/O adapter.

Referring to FIGS. 1 to 16, the workings of the I/O adapter of the present invention will be described below. Although the embodiment below has only four partitions for the sake of simplicity of description, any number of partitions can be provided so long as the hardware permits. Besides by providing a swapping function, substantially infinite number of partitions can be provided regardless of the number of hardware registers in the I/O adapter.

In FIG. 1, an I/O request output by one of the CPUs 10, 11, and 12 is input into the access partition discriminator 110 to determine, based on the accessed address, which partition has made access.

Figure 6:
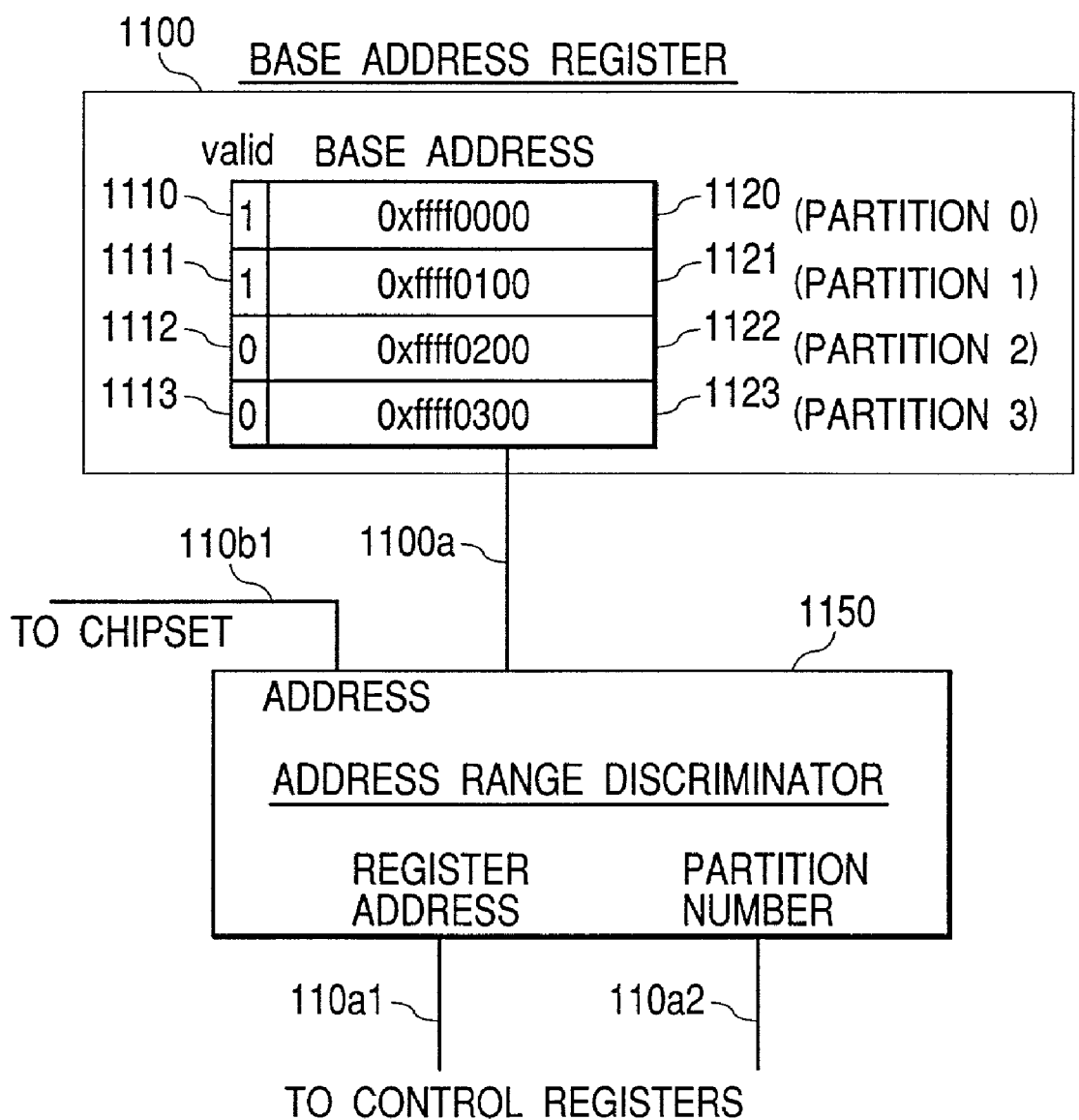
FIG. 6 is a block diagram of an access partition discriminator of the computer of FIG. 1.

FIG. 6 shows the details of the address portion of the access partition discriminator 110. The access partition discriminator 110 comprises a page address register 1100 and an address page discriminator 1150. The page address register 1100 holds the page addresses 1120 to 1123, which the partitions 0 to 4 use to access the I/O adapter, and valid bits 1110 to 1113 which regulate whether or not the partitions 0 to 4 are allowed access to the I/O adapter. Partitions having "1" in their valid bits are allowed access.

A partition-control program such as hypervisor or SVP puts "1" in the valid bits of partitions to allow access and allocates page addresses to the partitions. In the case of an I/O adapter shared by a plurality of partitions, the partition-control program puts "1" in the valid bits of the partitions and allocates different page addresses to the partitions. The operating system, or OS, of each partition is configured so as to access the I/O adapter by using the page address of said partition held in the page address register 1100. To change I/O adapters belonging to each partition, the page address register 1100 is changed.

The address portion 110*b*1 of an I/O access signal 110*b* output by one of the CPUs 10, 11, and 12 is input into the address range discriminator 1150. The address range discriminator 1150 searches for such a partition as the access address 110*b*1 of the CPU falls between the base address of the partition and the same base address plus the address area occupied by the I/O adapter 100. If such a partition is found, a partition number signal 110*a*2 of the number of the partition is output and a register address signal 110*a*1 of the access address minus the base address of the partition is output. The signals 110*a*1 and 110*a*2 and the other portion of the I/O access signal 110*b* are sent through a signal 110*a* to the control registers 120.

Figure 7:
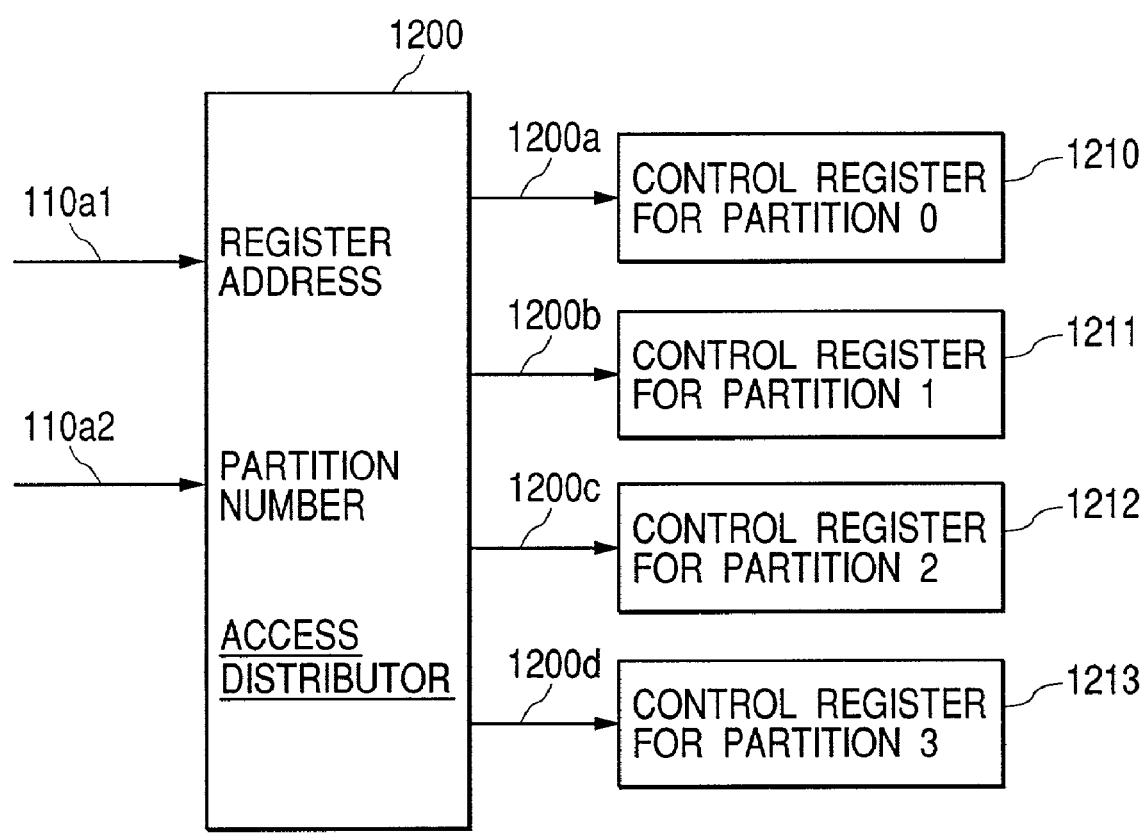
FIG. 7 is a block diagram of control registers of the computer of FIG. 1.

FIG. 7 shows the configuration of the control registers 120. The control registers 120 comprise an access distributor 1200 and control registers 1210 to 1213 corresponding to the partitions 0 to 3, respectively. The I/O access signal of the CPU sent through the signal 110*a* to the control registers 120 accesses the control register of a partition which corresponds to the partition number 110*a*2. I/O requests from a plurality of partitions are dealt with by providing every partition with a control register.

The I/O request input into the control registers 120 is sent through a signal 120*a* to the send circuit 130 or the receive circuit 180 for send or receive processing. The description of the control registers is omitted, for their details are the same as those of the control registers currently in use.

Before describing the workings of the send and receive circuits 130 and 180, the form of I/O packets used in the system of the present invention will be described. The size of packets transmittable through networks is fixed; therefore if the size of data in the main memory is larger than the packet size, the data have to be divided into packets of the fixed size.

Figure 13:
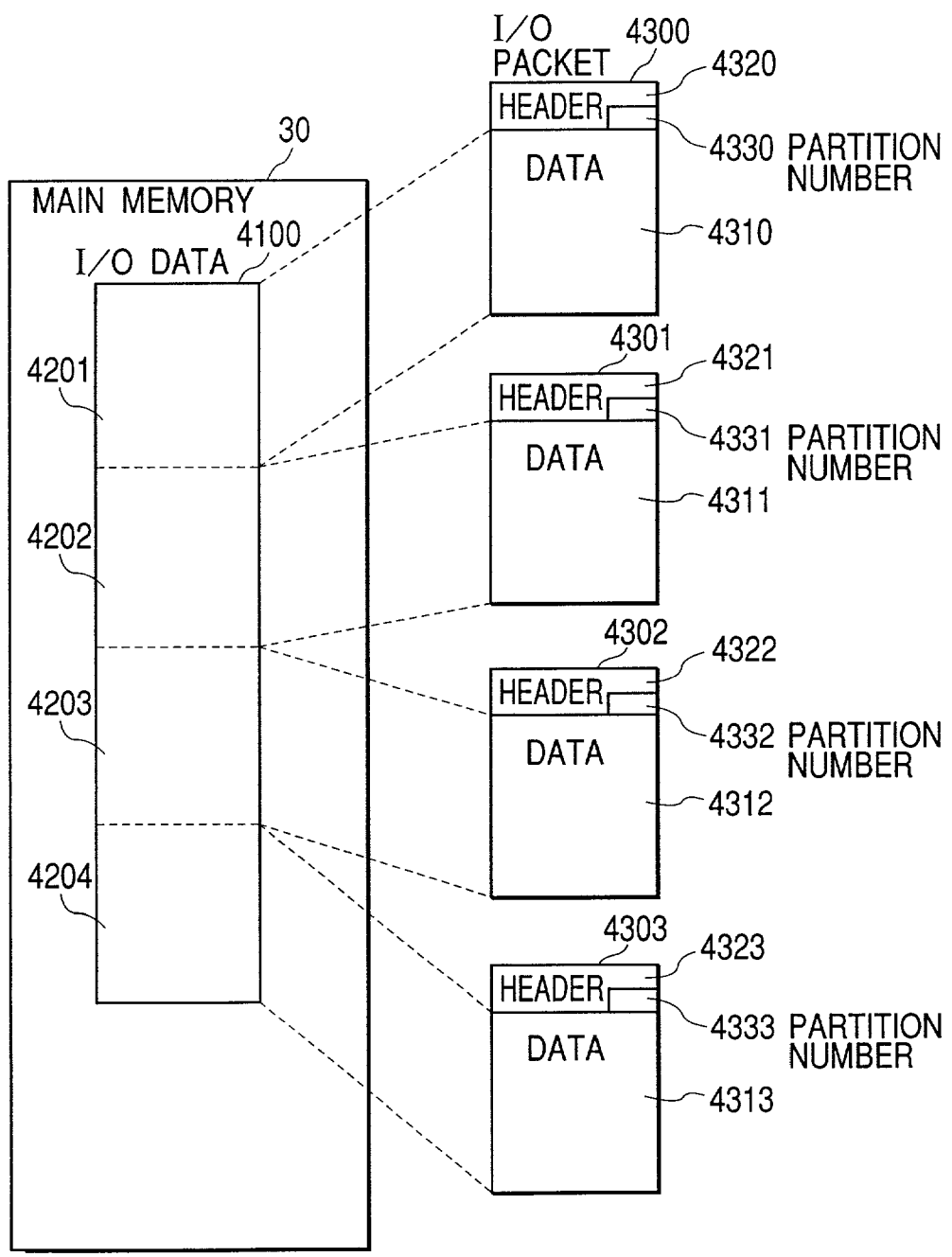
FIG. 13 is an illustration of an example of formats of I/O packets of the computer of FIG. 1.

FIG. 13 shows the relation between I/O data 4100 in the main memory 30 and I/O packets 4300 to 4303. In the figure, the I/O data 4100 is divided into four I/O packets 4300 to 4303. The I/O packets 4300 to 4303 include header segments 4320 to 4323, respectively, and data segments 4310 to 4313, respectively. The division of data into packets, the assembly of received packets, the format of headers, etc. are the same as those currently in practice or use, accordingly their description is omitted. The feature of the packet of the present invention is the segment (4330 to 4333) to hold the partition number which is added to the segments included in the packet currently transmitted through networks.

Figure 8:
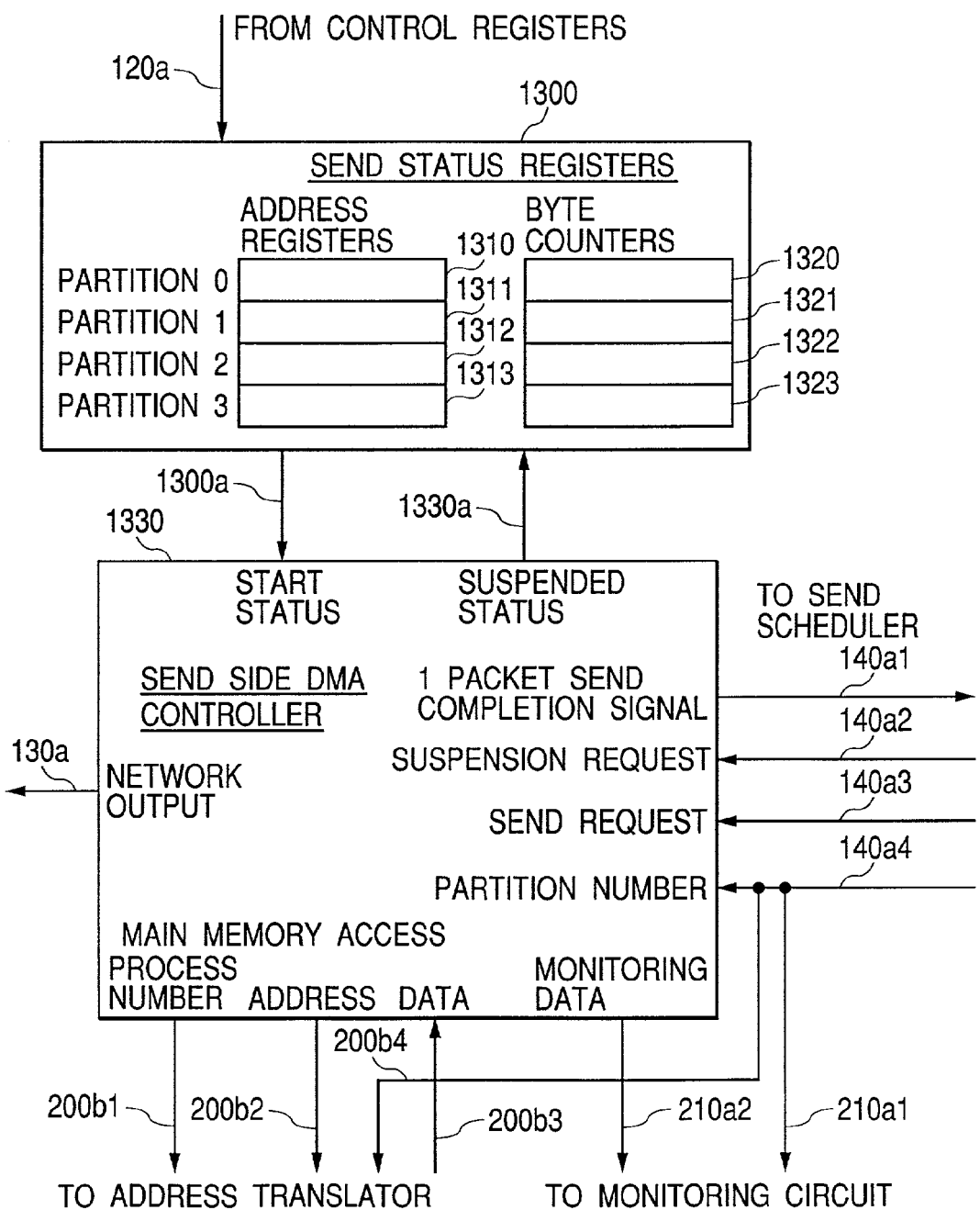
FIG. 8 is a block diagram of a send circuit of the computer of FIG. 1.

FIG. 8 shows the configuration of the send circuit 130. The send circuit 130 comprises a send-side DMA controller 1330 to execute actual data-transmission processing (DMA to the main memory 30), send status registers to indicate the data-transmission status of the partitions 0 to 3, address registers 1310 to 1313 to indicate the addresses of data being transmitted, and byte counters 1320 to 1323 to indicate the numbers of bytes of the remaining data to be transmitted. The I/O request 120*a* from the control registers 120 is input into the send status registers 1300 corresponding to the partition whose data are to be transmitted. Thereafter the send-side DMA controller 1330 operates under instructions by the send scheduler 140.

Figure 9:
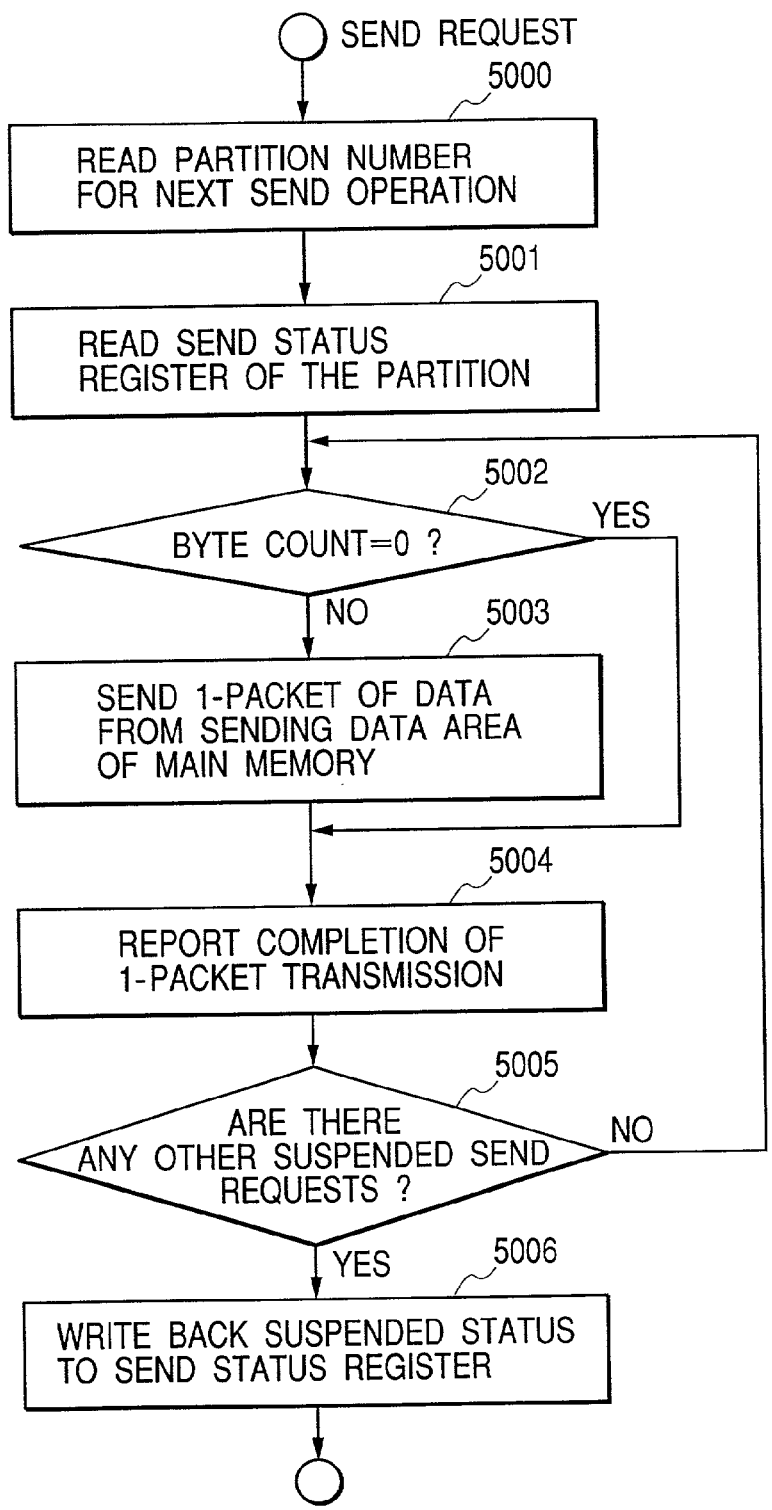
FIG. 9 is a flowchart of the processing of a send-side DMA controller of the computer of FIG. 1.

FIG. 9 is a flowchart of processing of the send-side DMA controller 1330. In the first place, a signal 140*a* bearing a send request 140*a*3 is sent from the send scheduler 140 to the send-side DMA controller 1330, and the send-side DMA controller 1330 reads the partition number 140*a*4 of the partition whose data are next transmitted in accordance with the send request 140*a*3 (Step 5000). Then the send-side DMA controller 1330 reads the address register and the byte counter of the partition of the partition number 140*a*4 (Step 5001).

If the byte counter indicates "0" (Step 5002), the partition 140*a*4 has no data to be transmitted; accordingly the send-side DMA controller 1330 shifts to Step 5004. If the byte counter is not "0", the send-side DMA controller 1330 transmits one packet of data in the main memory (Step 5003) and sends, to the send scheduler 140, a report on the completion of transmission of a packet (140a1) through a signal line 140a (Step 5004).

If the send scheduler 140 determines that it is necessary to stop the transmission of data of the partition 140a4 after transmitting a packet of data of the partition and transmit data of another partition, the send scheduler 140 sends a request for suspending the transmission (suspension request 140a2) through a signal line 140a. If the send-side DMA controller 1330 does not receive the suspension request 140a2, it returns to the Step 5002 and repeats the Steps 5002 to 5005 to continue transmitting data from the partition 140a4. If the send-side DMA controller 1330 receives the suspension request 140a2, it writes the intermediate state into the address register and the byte counter corresponding to the partition 140a4 in the send status register 1300. Thereafter the send-side DMA controller 1330 returns to Step 5000 to read the number of the partition whose data are to be transmitted next.

Because the user program of a partition makes data-transmission requests by referring to logical addresses, the send-side DMA controller 1330 accesses transmission data in the main memory 30 by using logical addresses; therefore it is necessary to provide each I/O adapter with an address translator 200 to convert logical addresses into physical ones. The send circuit 130 sends the number of a partition to be accessed 200b4, a process number 200b1, and logical addresses 200b2 through a signal 200b to the address translator 200, and the data 200b3 of the physical addresses corresponding the logical addresses are read out.

FIG. 12 shows the configuration of the adapter TLB 2000 in the address translator 200. The adapter TLB 2000 converts partition numbers 2001, process numbers 2002, and logical page numbers 2003 to physical page numbers 2004. The address-translating system and the TLB-constituting system are known technology; therefore their description is omitted.

Figure 3:
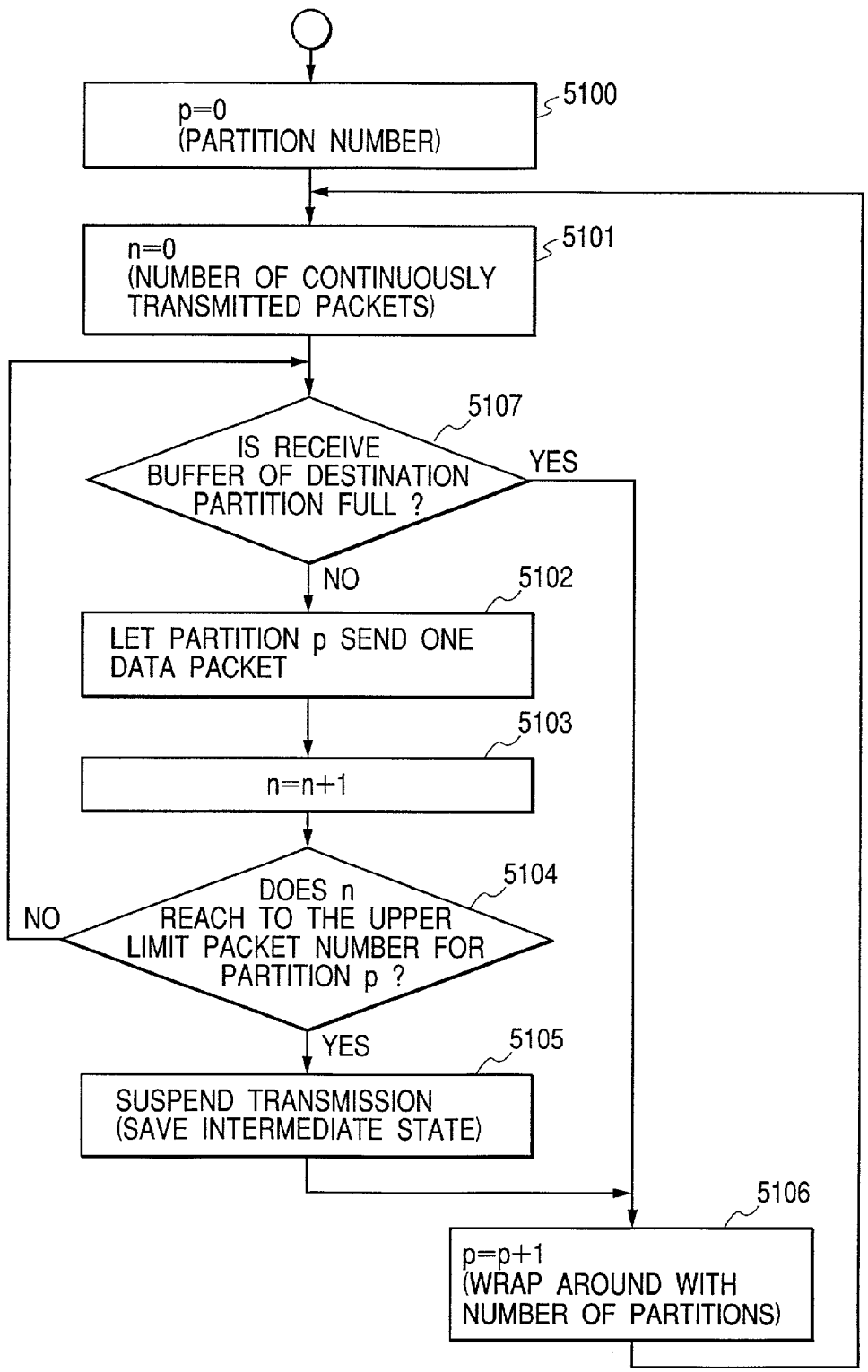
FIG. 3 is a flowchart of the processing of a send scheduler of the computer of FIG. 1.
Figure 4:
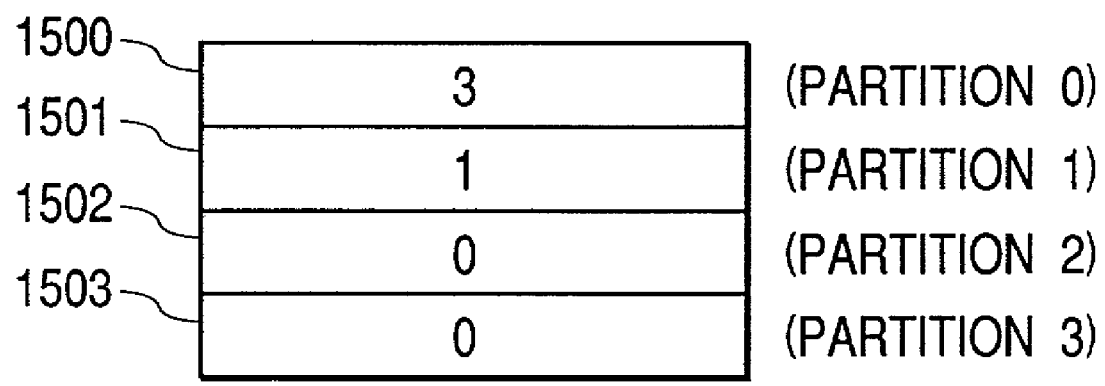
FIG. 4 is an illustration of a send/receive allocation register of the computer of FIG. 1.

Referring to FIG. 3, the operation of the send scheduler 140 will next be described in detail. In the following description, a local register "p" is a register to hold the number of the partition whose data are to be transmitted next. Indicated by "n" is the number of packets continuously transmitted from the current partition.

First, the local register "p" is initialized to "0" (Step 5100). Before the transmission of data of the partition "0", the number "n" is reset to "0" (Step 5101). It is ascertained that the receive buffer, corresponding to the partition "0", of the destination computer of the transmission data is not full (Step 5107). If the receive buffer is full, the send scheduler 140 shifts to Step 5106 to transmit data of the next partition. If it has been ascertained that the receive buffer is not full, the send scheduler 140 instructs to transmit a packet of data of the partition 0 (Step 5102) and the number "n" is changed from "0" to "1" (Step 5103).

The upper limit of "n" is prescribed beforehand for each partition. The "n" is checked with the upper limit of the partition "0" (Step 5104). If the number "n" has not reached the upper limit yet, the send scheduler 140 returns to Step 5102 to continue to transmit packets of the partition "0". When the number "n" has reached the upper limit, the send scheduler 140 sends a request for suspending the transmission (suspension request 140a2) through a signal line 140a to the send circuit 130 (Step 5105), changes the register "p" from "0" to "1" (Step 5106), and returns to Step 5101 to transmit data of the partition "1". When the register "p" exceeds the number of partitions, the register returns to "0".

The upper limit of the number "n" for each partition is held by the send/receive allocation register 150. In the case of the example of FIG. 4, the send circuit 130:

transmits three packets of data of the partition "0";
transmits one packet of data of the partition "1"; and
repeats the above steps of transmission, so that the partitions "0" and "1" occupy 75% and 25% of the total transmission, respectively.

As described above, if once the partition-control program sets appropriate values beforehand in the send/receive allocation register 150, the hardware of the I/O adapter 100 executes dynamically the allocation of the I/O capacity among the partitions. The partition-control program changes the values in the send/receive allocation register 150 to change the allocation of I/O capacity among the partitions penetratingly through the OSs and the user programs running on the partitions (under the processing by the partition-control program alone without interfering with the OSs and the user programs).

Figure 5:
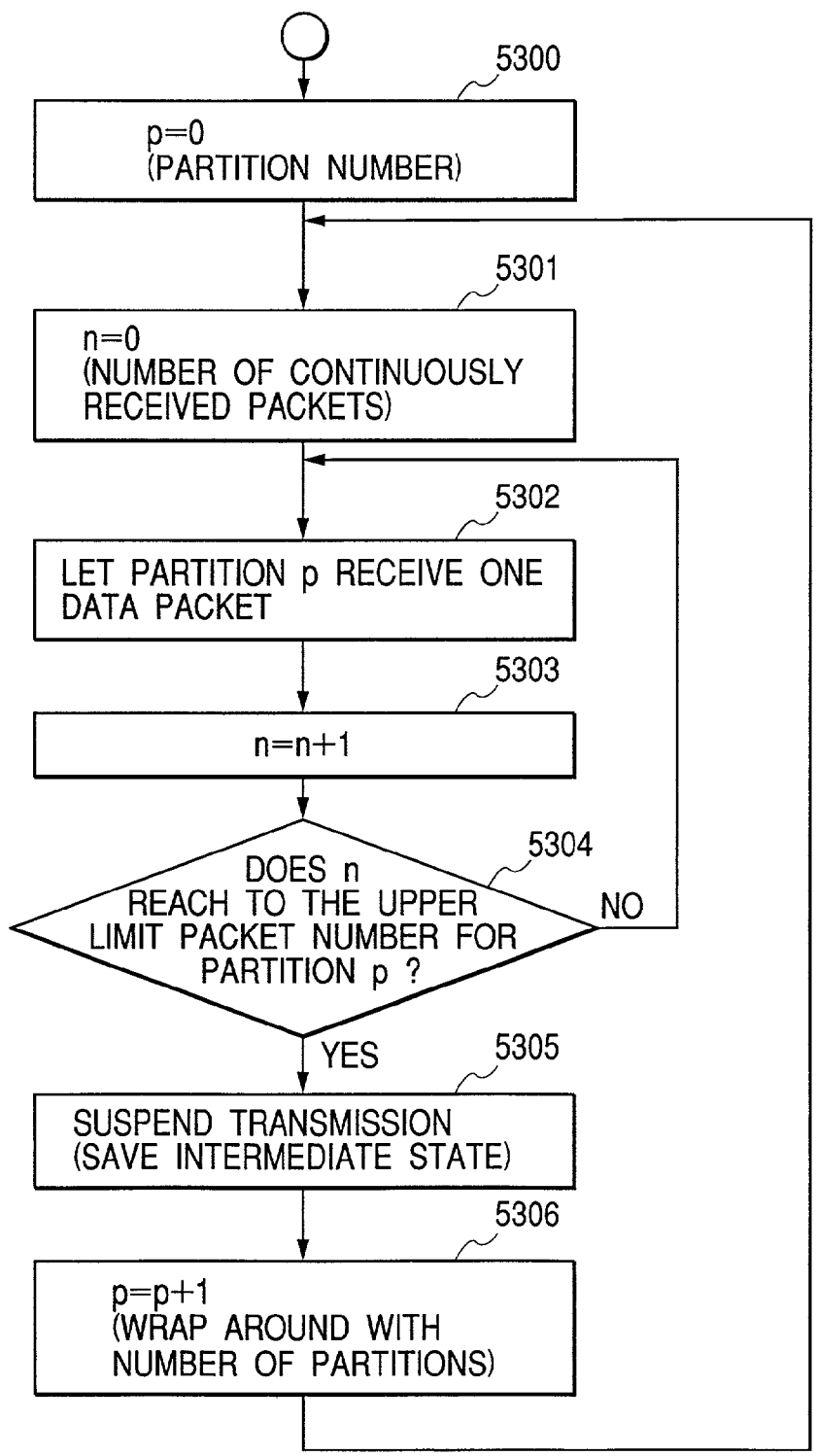
FIG. 5 is a flowchart of the processing of a receive scheduler of the computer of FIG. 1.
Figure 10:
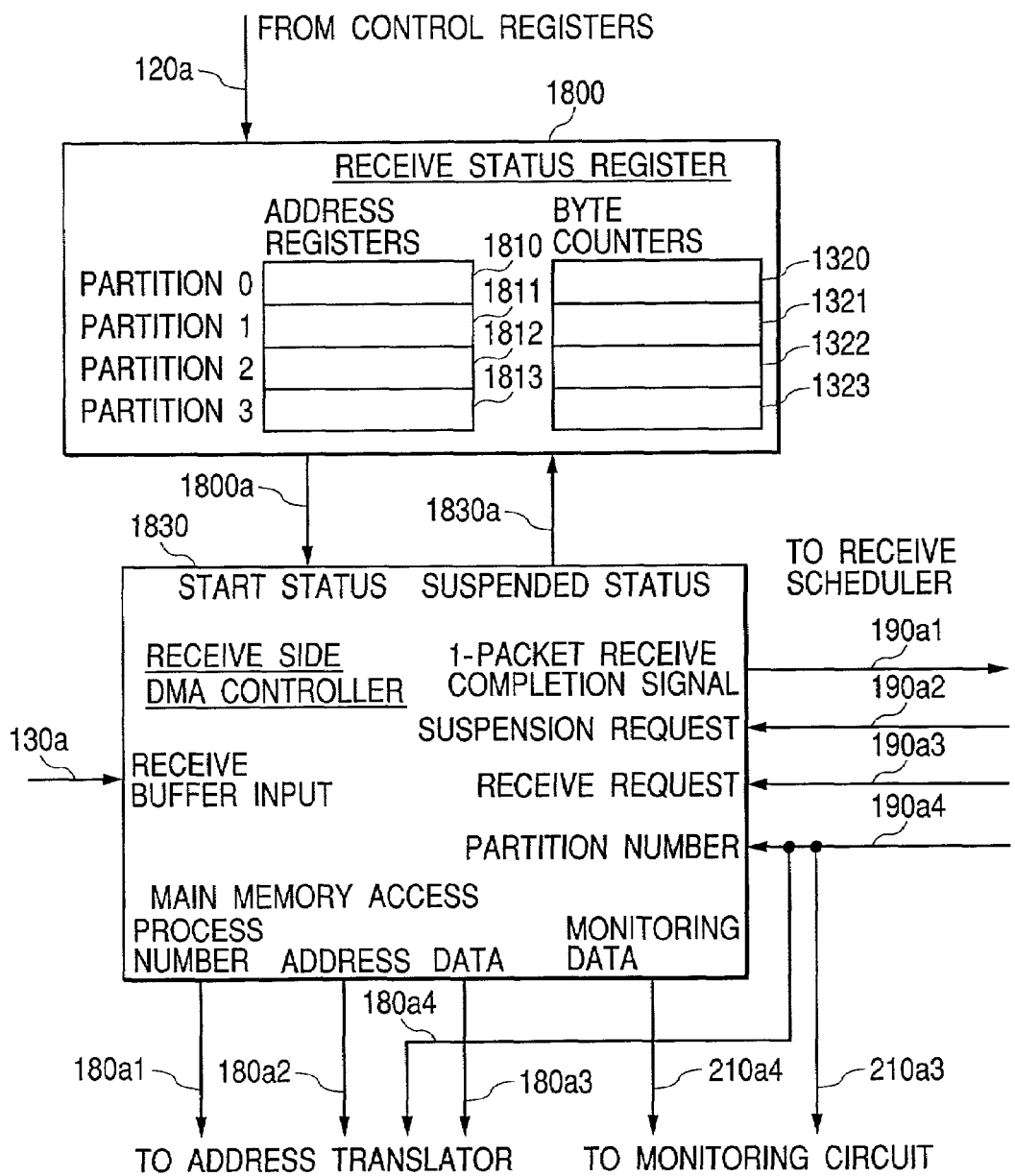
FIG. 10 is a block diagram of a receive circuit of the computer of FIG. 1.
Figure 11:
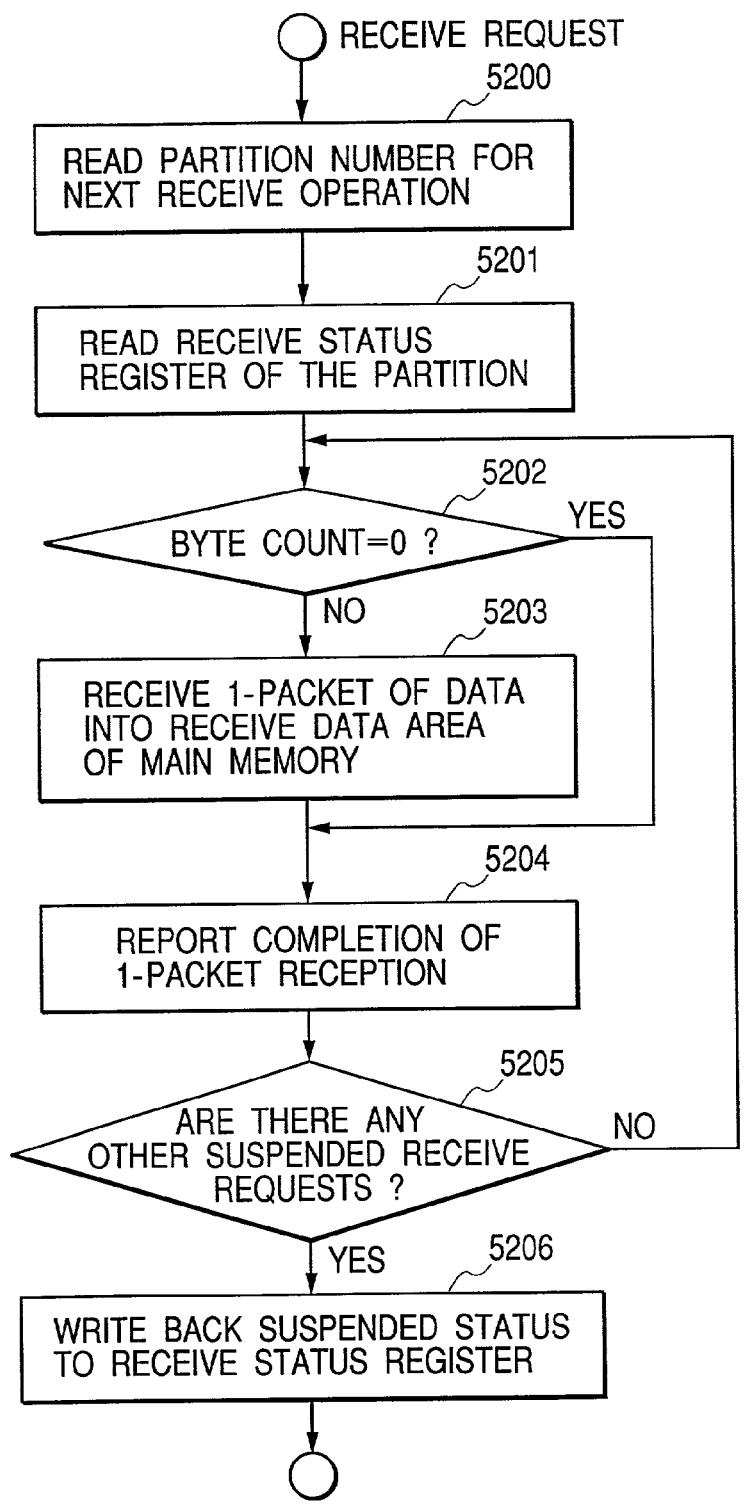
FIG. 11 is a flowchart of the processing of a receive-side DMA controller of the computer of FIG. 1.

Now the workings of the receiving side will be described. FIG. 10 shows the details of the receive circuit 180. FIG. 11 is a flowchart of processing of a receive-side DMA controller 1830. FIG. 5 is the flowchart of processing of the receive scheduler 190. As the workings on the receiving side is the same as those on the sending side, detailed description of the receiving side is basically omitted. A difference is that the send-side DMA controller 1330 reads data from the main memory 30 and outputs the data through a signal 130a to the I/O network 100a, whereas the receive-side DMA controller 1830 reads data from the receive buffer 170 and writes the data 180a3 into the main memory 30 through a signal 180a. Besides there is not a step to check to see if the send buffer of the data-sending computer is full.

Figure 14:
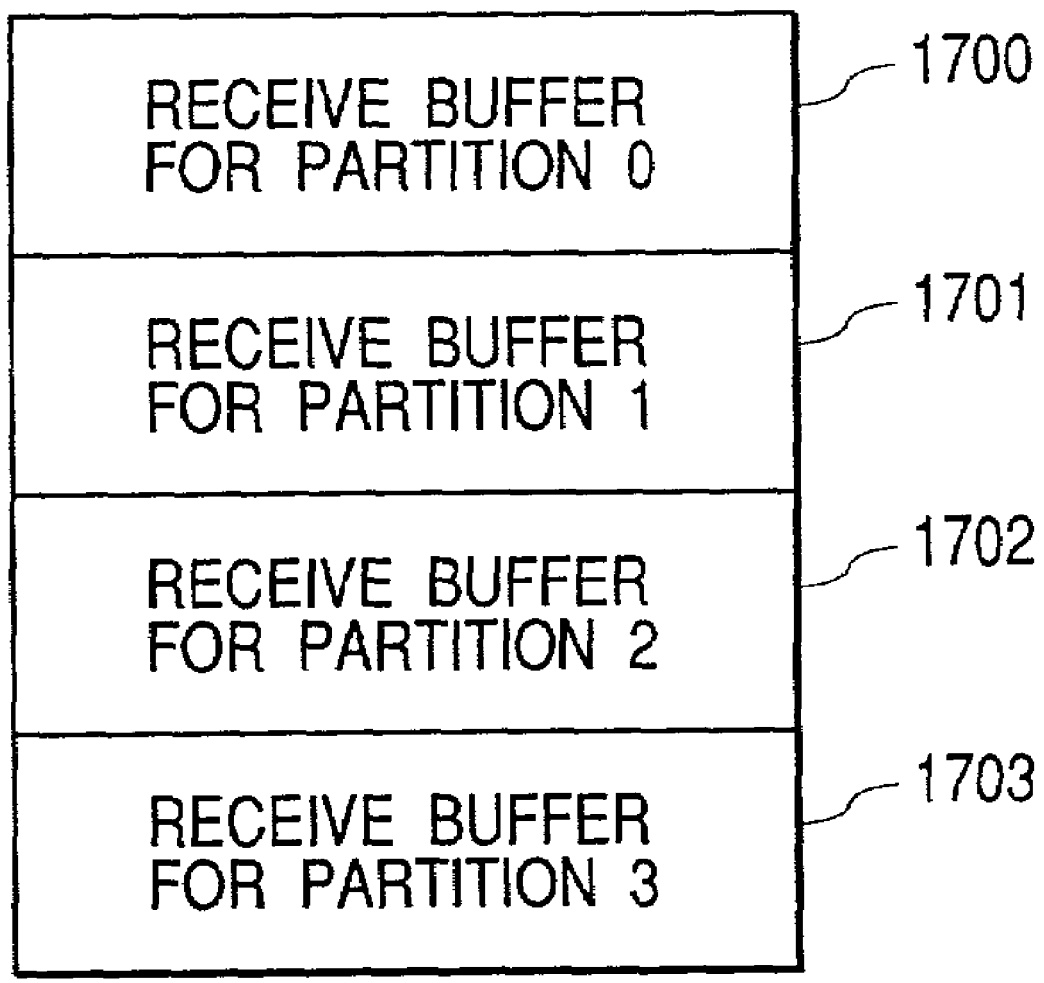
FIG. 14 is an illustration of a receive buffer of the computer of FIG. 1.

FIG. 14 shows the configuration of the receive buffer 170. The receive buffer 170 has individual buffers 1700 to 1703 for the partitions 0 to 4, respectively. The partition number such as 4330 in the partition-number segment of a received packet is read and the packet is stored in the individual buffer of the same partition number. The receive buffer 170 is provided to cope with the difference between the order of partition-oriented packets being received from the I/O network 100a and the order of the received data being written into the main memory 30 by the receive scheduler 190. If the input buffer of a scheduled partition is empty, no data are input. If the input buffer becomes full of data, the transmission of data to the partition is stopped by the flow control of the I/O network 100a.

The above description centered on a mechanism to control the allocation of an I/O adapter among partitions on a time-sharing basis (see FIG. 2B). Now a system to control the allocation of a plurality of I/O adapters among a plurality of partitions on a space-sharing basis will be described (see FIG. 2C). An I/O adapter can be allocated to a partition by putting "1" in the valid bit corresponding to the partition in the access partition discriminator 110 of the I/O adapter 100.

While the allocation of an I/O adapter among partitions can be changed transparently through the OSs running on the partitions in the case of a time-sharing system, it is necessary in the case of a space-sharing system that the partition-control program and the OSs running on the partitions work in harmony to change the allocation of I/O adapters among partitions because the numbers of I/O adapters allocated to the individual partitions are changed.

Figure 16:
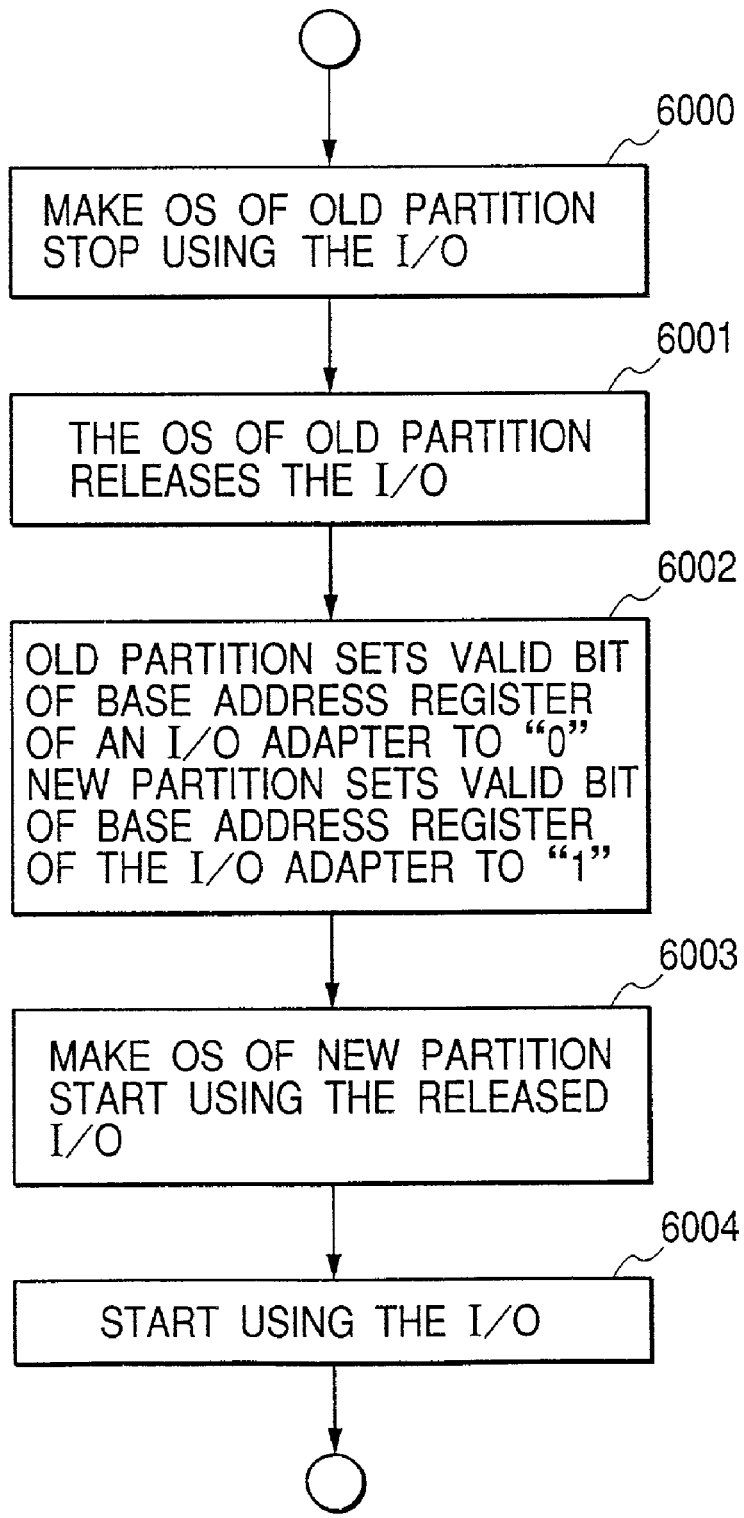
FIG. 16 is a flowchart of the process of shifting an space-shared I/O adapter from a partition to another in the computer of FIG. 1.

FIG. 16 shows algorithm for shifting I/O adapters among partitions. It is assumed here that the OSs running on partitions, whose allocations of I/O adapters are to be changed, are capable of dynamic hot plugging-in of I/O adapters. An I/O adapter is switched over from the current partition to another partition through the following steps (FIG. 16).

The partition-control program instructs the OS on the current partition to stop using the I/O adapter (Step 6000). The OS stops using the I/O adapter and disconnects the I/O adapter from itself (Step 6001). Then the partition-control program changes the status of the two partitions in question held in the valid bits (1110-1113) of the page address register 1100 in the access partition discriminator 110 of the I/O adapter to prohibit the current partition from using the I/O adapter and permit the other partition to use the I/O adapter (if necessary, I/O addresses are reallocated) (Step 6003). The OS on the now-permitted partition starts to use the I/O adapter (Step 6004). Thus the logical hot plugging-in and shift of I/O adapters from partition to partition can be accomplished and thereby the dynamic control of the allocation of I/O adapters among partitions on a space-sharing basis can be achieved.

To control the allocation of I/O adapters among partitions individually, it is necessary to determine the I/O performance of the individual partitions. For this purpose, each I/O adapter is provided with a monitoring circuit 210.

Figure 15:
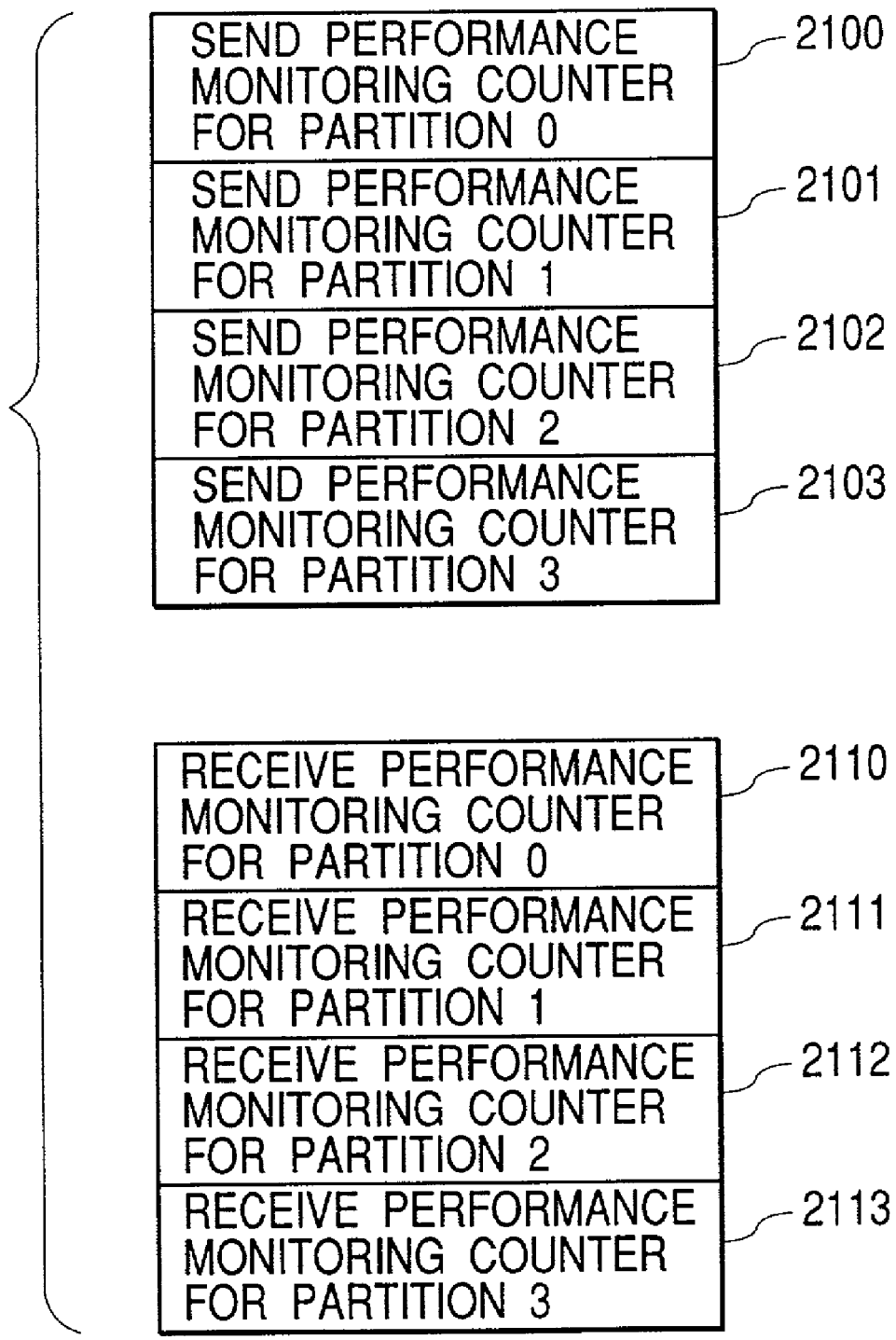
FIG. 15 is an illustration of a monitoring circuit of the computer of FIG. 1.

FIG. 15 shows the internal configuration of the monitoring circuit 210. As shown in the figure, monitoring counters 2100 to 2103 and 2110 to 2113 are provided to measure the sending performance and the receiving performance of the individual partitions 0 to 4. The following measurements are taken.

[On Sending Side]

Latency before transmission (Waiting time from the enqueuing of transmission up to the actual transmission to the I/O network 100*a*)

Quantity of data transmitted (Transmission throughput is found by dividing the quantity of data transmitted by the time needed for the transmission.)

[On Receiving Side]

Latency before receiving (Waiting time from the arrival of data packets from the I/O network 100*a* up to the actual copying of the data into the main memory)

Quantity of data received (Receiving throughput is found by dividing the quantity of data received by the time needed for the receiving.)

By monitoring the above measurements, bottlenecks in the I/O performance of the partitions can be found. The description of the monitoring is omitted, for the details are the same as those of the monitoring currently in practice.

By providing the following system and functions in addition to the above, the control of the allocation of I/O adapters among partitions can be made use of for calculating charges to be paid by users.

(1) To enter into a contract with the user as to the standard allocations of I/O adapters to partitions, conditions for changing allocations, and premiums for expanded allocations.

(2) When the partition-control program has changed the allocation of I/O adapters to a certain partition, the time of the change and the new allocation of I/O adapters to the partition are recorded in a log.

(3) At the time of the calculation of charges to be paid by the user, premium is calculated according to the prescribed contact by referring to the log.

With the above system and functions, premiums to be paid by users can be calculated in accordance with time periods when partitions with expanded allocations served users.

The above description centered on the mechanism to control the allocation of I/O adapters among partitions. Now referring to FIGS. 17 to 20, how to control the performance of the system by using said mechanism in several cases will be described. Although the following description centers on time-sharing control, space-sharing control can be made in similar ways.

(1) Manual change of allocation of an I/O adapter among partitions by an operator FIG. 17 shows an interface for the operator to instruct the partition-control program to change the allocations of an I/O adapter to partitions. Reference numeral 7000 is a display on the operator's console. The upper half 7010 of the display 7000 is to monitor the performance of the individual partitions. The operator inputs instructions for a change of allocations of the I/O adapter to partitions in the lower half 7020 of the display 7000. The current allocations are shown in the area of 7020, and new allocations are instructed in input areas 7030 and 7031. In FIG. 17, the current 50%:50% allocation to the partitions 0 and 1 are being changed to new 75%:25% allocation.

In the partition-control program, the ratio of I/O allocation for each partition is rounded to the simplest possible whole number (of an approximate value, if necessary), and the send/receive allocate register 150 is informed of the number of packets that each partition can continuously send and receive. As seen in FIG. 17, since 75%:25%=3:1, "3" is written in area 1500 (FIG. 4) corresponding to the partition 0 of the send/receive allocate register, and "1" is written in area 1501 corresponding to the partition 1.

According to the means described above, I/O allocation of the partition 0 and the partition 1 can be controlled as 75% and 25%, respectively. According to the above means, an operator can monitor operating condition of the system and can change its I/O allocation.

Though transmission delay is monitored in FIG. 17, the process is the same when reception delay is monitored.

(2) Booking and automatic change of I/O allocation by a setting file

An example of a file setting I/O allocation of each partition is shown in FIG. 18. In FIG. 18, instructions are given to change the setting of I/O allocation of partitions as follows:

Set I/O allocation of partition 0 and partition 1 as 50% and 50%, respectively, at 8:00 a.m.

Set I/O allocation of partition 0 and partition 1 as 75% and 25%, respectively, at 6:00 p.m.

According to the above setting file, the partition-control program changes contents of the send/receive allocate register at the designated time. The specific changing method is the same as (1).

(3) Automatic track shift in accordance with CPU allocation change

When the partition control program changes CPU allocation for each partition, the I/O allocation is automatically changed in proportion to the ratio of the CPU allocation. It is an effective method when there is no request for positively changing I/O allocation alone.

(4) Automatic change of I/O allocation

Based on measured results of I/O performance of partitions and the prescribed change condition of I/O allocation, the partition control program changes the I/O allocation without mediation of an operator.

An automatic changing method of the I/O allocation is shown in FIG. 19. The partition-control program periodically carries out the process shown in FIG. 19. First, I/O performance of each partition is monitored (Step 7100). As a result of monitoring, it is checked if it matches the prescribed change condition of I/O allocation (Step 7101). The I/O allocation change condition is shown by the following set of condition and action.

Condition . . . I/O delay of partition 0 is 500 ms or over
Action . . . I/O allocation of partition 0 is increased to 75%

When conditions are met, specified action is carried out, and I/O allocation is changed (Step 7102).

Further, it is recorded in a log that the I/O allocation of the above partition is increased (Step 7103). Accordingly, additional charge can be calculated in accordance with time periods when partitions with expanded I/O allocations served users.

(5) SLA Guarantee

By developing the automatic guarantee of the I/O allocation described in (4) and changing the I/O allocation, it is possible to guarantee SLA of user programs. In an internet data center, etc., for the purpose of reducing cost of a server, it is desired to provide a plurality of partitions in a single server and to run programs of a plurality of users. In that case, it is required to meet SLA including response time, etc. that are promised to users. In order to cope with loads of the Internet changing every moment, it is required to adaptively change not only CPU allocation but also I/O allocation in accordance with such loads.

Figure 20:
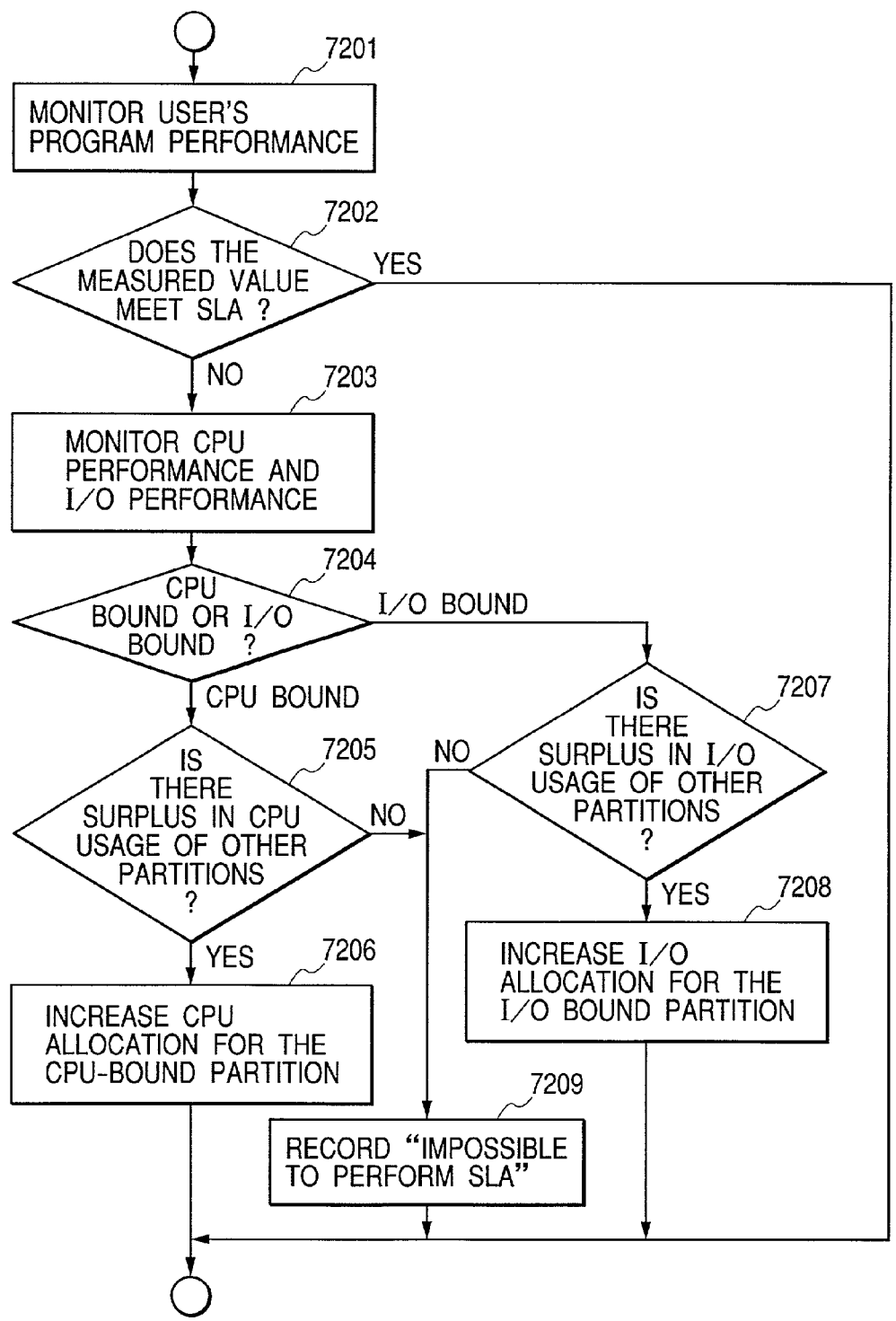
FIG. 20 is a flowchart of the process of maintaining the SLA level of the computer of FIG. 1.

In order to perform SLA, the partition-control program conducts the processing shown in FIG. 20. First, user's program performance of each partition is monitored (Step 7201) to determine if the measured value meets SLA (Step 7202). If the measured value hasn't met SLA (or if it is likely that the measured value won't meet SLA), CPU performance and I/O performance are monitored to find out the reason why SLA can't be achieved (Step 7203). To be specific, CPU usage ratio and I/O usage ratio of the above partition are measured from CPU allocation and I/O allocation for the monitored partition and time used for the CPU and I/O, so that the reason is identified as a CPU bound or an I/O bound (Step 7204). When CPU usage ratio is 30% and I/O usage ratio is 95%, for example, it is determined that the reason is the I/O bound.

When the reason is the I/O bound, it is checked whether there is surplus in I/O usage of other partitions (step 7207). If there is surplus, I/O allocation of the system is adjusted to increase the I/O allocation of the partition forming the performance bound (Step 7208). When the reason is found out to be the CPU bound, the similar processing is conducted (Step 7205, 7206). When there is no surplus in CPU usage or I/O usage of other partitions and the necessary resource allocation could not be increased, a record is made in a log as "impossible to perform SLA" (7209). This record is used later for processing such as refunding or reducing the charge for the time during which SLA hasn't been performed.

According to the configuration described above, in a system having a plurality of partitions, it becomes possible to dynamically change I/O allocation of each partition and to achieve maintaining SLA of a user program being run on the partition by using above configuration.

[Modified Examples]

The present invention is not limited to the above embodiments and can be applied to various modified examples.

(1) For example, according to the above embodiments, in the access partition discriminator 110, an accessed partition is determined by the accessed address. However, it is possible to explicitly indicate partitions as follows:

Bits showing partition numbers are added to a signal 110*b* for the I/O adapter from the chip set.

A register explicitly setting access partition numbers is provided inside the access partition discriminator 110 on the adapter side (In this case, the OS or the partition-control program sets the above register before starting the I/O).

(2) In the above embodiments, upper limits on the number of packets for both sending and receiving are stored in the send/receive allocate register (150). However, it is possible to control I/O allocation of sending and receiving independently by storing upper limits on the number of packets for sending and receiving separately.

(3) Further, in the above embodiments, input and output of each partition are switched for every packet. However, it is possible to switch at every given time period by time slice. In that case, on a send/receive network, virtual channel control for each partition is required.

(4) Further, in the above embodiments, the send/receive allocate register 150 stores a simple parameter, namely, the number of packets that each partition can continuously send and receive. However, by providing additional function to the send scheduler 140, etc., it becomes possible to perform more complicated control.

For example, such controls are possible as the number of cycles that a given partition can continuously send is stored using a fractional number and, in FIG. 3, to send and receive data once for a corresponding data by a plurality of repetition.

(5) Also, in the above embodiments, send/receive scheduling is done by hardware 140, 190, 150. However, it is possible to interrupt a partition-control program such as hypervisor and SVP for each transmission of a packet, and to have the partition-control program carry out I/O scheduling softwarewise.

(6) Also, in the above embodiments, the partition-control program determines I/O allocation for partitions according to SLA. However, it is possible to determine I/O allocation conditions by an external program (a policy control program) of the partition-control program, and request the partition-control program to actually change the I/O allocation. Further, it is also possible to determine SLA of the entire system by an external computer (such as a policy server), and request the partition-control program to change I/O allocation.

In the above case, since the external server instructs the partition-control program to change the I/O allocation, an API to provide a list of I/O allocation for each partition in the system is required. By using the API described above, it becomes possible for the external program to forcefully change the I/O allocation of each partition of the system.

According to the present invention, in a computer system divided into partitions, an I/O adapter and a partition-control program are provided with means to control I/O performance allocated to each partition by time sharing and space sharing, etc. Therefore, I/O allocation to each partition can be controlled independently of CPU allocation and can be dynamically changed. Further, SLA of user program on a partition is performed by dynamically changing the I/O allocation.

What is claimed is:

1. A computer system comprising:
   one or more CPUs;
   a main memory;
   software means for logically dividing the computer system into a plurality of logical partitions each of which includes a subset of the main memory and a subset of CPUs that works independently from the remaining CPUs or under a time-sharing manner with the remaining CPUs; and control means including one or more input/output adaptors, each of the adaptors being connected to an input/output device through a network, controlling outbound access of reading-out outbound data packets from said logical partitions, sending the outbound data packets to said input/output device, and controlling inbound access of writing inbound data packets, said inbound data packets being transmitted from said input/output device and stored in receive buffers provided individually for each of said logical partitions according to a destination of each inbound data packet, into said main memory, wherein each of said input/output adaptors includes:

a send/receive allocation register for storing a value set indicating input/output performance allocation among said logical partitions as to the inbound/outbound access of said each input/output adaptor;

a send scheduler for switching a reading-out target from which the outbound data packets are read-out among said logical partitions, according to said value set stored in said send/receive allocation register;

a receive scheduler for switching a reading-out target from which the inbound data packets are read-out to write into said main memory among said receive buffers, according to said value set stored in said send/receive allocation register.

2. The computer system according to claim 1, wherein said send/receive allocation register stores a number of outbound data packets to be consecutively read-out from each of the partitions, and said send scheduler controls timings for shifting the reading-out target among the logical partitions, according to the stored number of the outbound data packets to be consecutively read-out.

3. The computer system according to claim 1, wherein said send/receive allocation register stores a number of inbound packets to be consecutively read-out from each of the receiving buffers provided for each of the partitions, and said receive scheduler controls a timing for shifting the reading-out target among the receiving buffers, according to the stored number of the inbound data packets to be consecutively read-out.

* * * * *